(12) United States Patent
Wang et al.

(10) Patent No.: US 11,098,875 B2
(45) Date of Patent: Aug. 24, 2021

(54) DIFFUSER AND INDICATION PANEL

(71) Applicants: Hefei Xinsheng Optoelectronics Technology Co., Ltd., Anhui (CN); BOE Technology Group Co., Ltd., Beijing (CN)

(72) Inventors: Kaiwen Wang, Beijing (CN); Haifeng Xu, Beijing (CN); Zhenyu Han, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/838,659

(22) Filed: Apr. 2, 2020

(65) Prior Publication Data
US 2021/0164635 A1    Jun. 3, 2021

(30) Foreign Application Priority Data
Nov. 28, 2019    (CN) .......................... 201922089483.8

(51) Int. Cl.
| | | |
|---|---|---|
| *G01D 13/04* | (2006.01) | |
| *F21V 3/04* | (2018.01) | |
| *F21W 106/00* | (2018.01) | |
| *B60K 35/00* | (2006.01) | |
| *G07C 5/08* | (2006.01) | |

(52) U.S. Cl.
CPC .............. *F21V 3/049* (2013.01); *B60K 35/00* (2013.01); *B60K 2370/167* (2019.05); *B60K 2370/178* (2019.05); *B60K 2370/33* (2019.05); *F21W 2106/00* (2018.01); *G07C 5/0825* (2013.01)

(58) Field of Classification Search
CPC ........ B60K 2370/167; B60K 2370/168; B60K 2370/178; B60K 35/00; B60K 2370/33; F21V 3/049; F21W 2106/00; G07C 5/0825
See application file for complete search history.

(56) References Cited

U.S. PATENT DOCUMENTS 4,882,565 A * 11/1989 Gallmeyer ................ B60R 1/12
340/461

* cited by examiner

*Primary Examiner* — Donald L Raleigh
(74) *Attorney, Agent, or Firm* — Banner & Witcoff, Ltd.

(57) ABSTRACT

A diffuser and an Indication panel are provided. The diffuser includes: a plurality of light-transmitting regions; and a light-shielding region located between adjacent ones of the plurality of light-transmitting regions, and each of the light-transmitting regions corresponds to an icon symbol on the indication panel. The diffuser is employed to avoid a phenomenon of light leakage between adjacent icon symbols, thereby improving the display effect of the indication panel.

12 Claims, 2 Drawing Sheets

DIFFUSER AND INDICATION PANEL

CROSS REFERENCE TO RELATED APPLICATION

The present application claims priority to and the benefit of Chinese Patent Application No. 201922089483.8 filed on Nov. 28, 2019, the disclosure of which is incorporated herein by reference in its entirety as part of the present application.

TECHNICAL FIELD

Embodiments of the present disclosure provide a diffuser and an indication panel.

BACKGROUND

At present, various electrical appliances such as washing machines and vehicles are provided with an indication panel. For example, an indication panel provided on a vehicle may include a vehicle-mounted dashboard for displaying parameters such as a driving speed, a rotating speed of an engine, and an amount of fuel/electricity.

SUMMARY

Embodiments of the present disclosure provides a diffuser and an indication panel. The diffuser is employed to avoid a light leakage between adjacent icon symbols, thereby improving display effect of the indication panel.

At least one embodiment of the present disclosure provides a diffuser applied to an indication panel, which includes: a plurality light-transmitting regions; and a light-shielding region located between adjacent ones of the plurality of light-transmitting regions; each of the light-transmitting regions corresponds to an icon symbol on the indication panel.

For example, in the diffuser provided by embodiment of the present disclosure, the indication panel includes a plurality of icon symbols, and the plurality of light-transmitting regions are in a one-to-one correspondence with the plurality of icon symbols.

For example, in the diffuser provided by embodiment of the present disclosure, an orthographic projection of the icon symbol on the diffuser falls within one of the plurality light-transmitting regions that corresponds to the icon symbol.

For example, in the diffuser provided by embodiment of the present disclosure, an area of the light-transmitting region is larger than that of an orthographic projection of the icon symbol that corresponds to the light-transmitting region on the diffuser.

For example, in the diffuser provided by embodiment of the present disclosure, a radial width of the light-transmitting region is larger than that of the icon symbol by 0.5 mm.

For example, in the diffuser provided by embodiment of the present disclosure, a space between adjacent icon symbols is less than 3 mm, the diffuser includes a groove, and the groove is located in the light-shielding region.

For example, in the diffuser provided by embodiment of the present disclosure, the light-shielding region includes printing ink located on a surface of the diffuser away from the icon symbol.

For example, in the diffuser provided by embodiment of the present disclosure, the light-shielding region includes a light-shielding material.

For example, in the diffuser provided by embodiment of the present disclosure, the indication panel includes a cover and a housing, the diffuser is located between the cover and the housing, and a plurality of icon symbols are located on the cover, the housing has a plurality of receiving chambers corresponding to the plurality of icon symbols, respectively, and each of the plurality of receiving chambers is configured to receive a light source.

At least one embodiment of the present disclosure further includes an indication panel, which includes: a cover; a housing; and a diffuser, located between the cover and the housing; the diffuser comprises a plurality light-transmitting regions, and a light-shielding region located between adjacent ones of the plurality of light-transmitting regions, each of the light-transmitting regions corresponds to an icon symbol on the indication panel.

For example, in the indication panel provided by embodiment of the present disclosure, the indication panel includes a plurality of icon symbols, and a space between adjacent icon symbols is less than 3 mm, the housing includes a side wall configured to form the plurality of receiving chambers, and the diffuser includes a groove located in the light-shielding region, so that a top portion of the side wall is inserted in the groove.

For example, in the indication panel provided by embodiment of the present disclosure, the top portion is provided with a protrusion, and the protrusion is configured to be inserted into the groove.

For example, in the indication panel provided by embodiment of the present disclosure, the groove and the protrusion are matched with each other in a manner of clearance fit.

For example, in the indication panel provided by embodiment of the present disclosure, a height of the protrusion is 0.4 mm.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1:
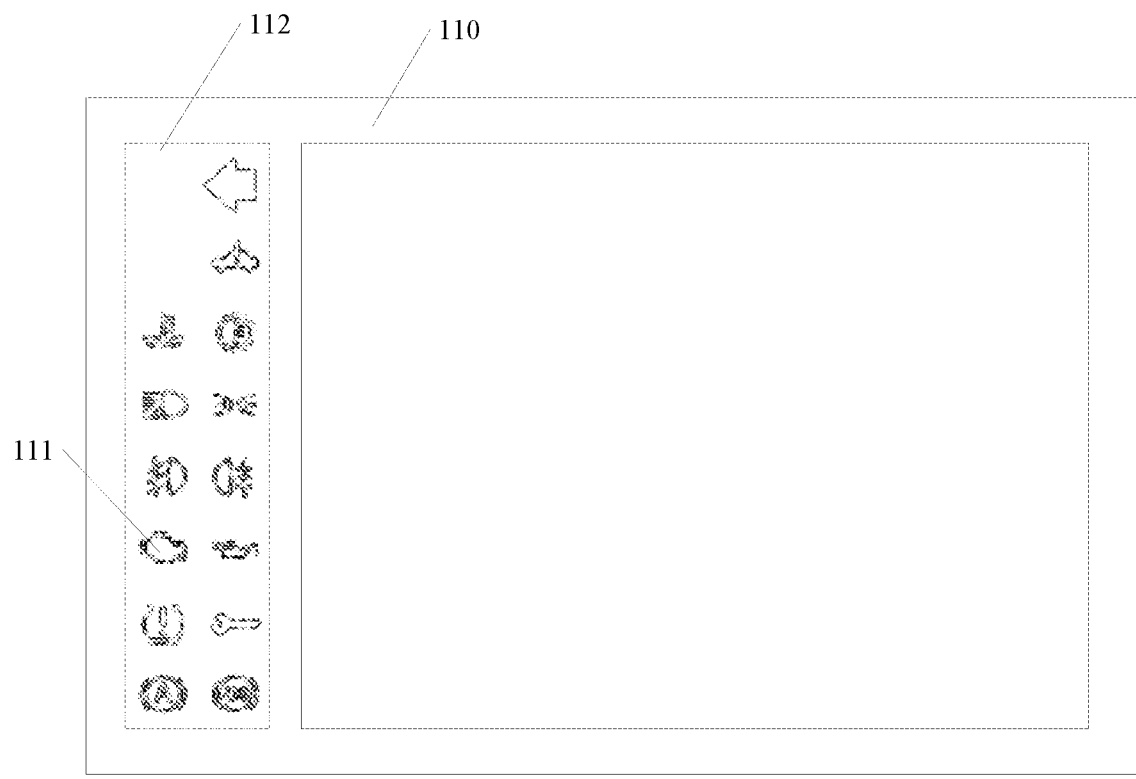
FIG. 1 is a schematic diagram of a vehicle-mounted dashboard.

FIG. 1 is a schematic diagram of a vehicle-mounted dashboard. As illustrated in FIG. 1, in order to increase intelligent display function of the vehicle-mounted dashboard, in addition to providing pointers/icons that show a driving speed, a rotating speed of an engine, and an amount of fuel/electricity, the vehicle-mounted dashboard is usually designed with various other icon symbols 111, such as various failure identification, prompt identification, function identification, etc. These icon symbols 111 are formed in an icon region 112 of a cover 110 of a vehicle-mounted dashboard. Upon the vehicle being in a certain state, the corresponding icon symbol 111 is illuminated, and other icon symbols 111 as well as other regions of the cover 10 are in a dark state.

Figure 2:
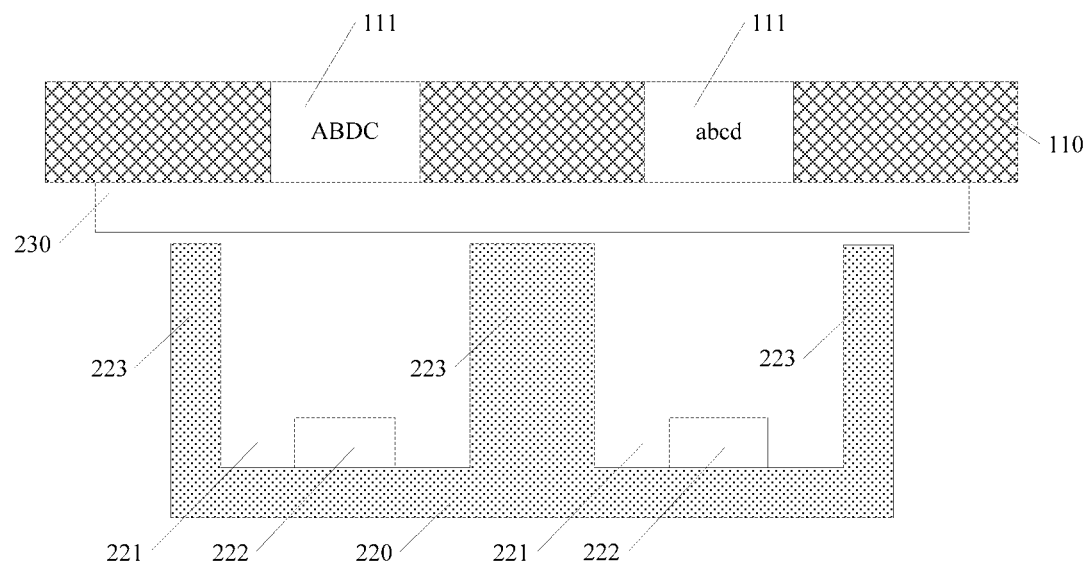
FIG. 2 is a cross-sectional view of a vehicle-mounted dashboard.

As illustrated in FIG. 2, in order to achieve the above functions, a housing 220 of the vehicle-mounted dashboard is formed with a plurality of receiving chambers 221 corresponding to the icon symbols 111, respectively. The receiving chamber 221 receives a light source 222. That is, each icon symbol 111 corresponds to one light source 222, the light source 222 is usually an LED light source, and the above-mentioned correspondence is usually a correspondence in orthographic projection, that is, one light source 222 is arranged directly below each icon symbol 111. Upon it being needed to illuminate one or several icon symbols 111, the light source 222 under the icon symbol 111 to be lit may be driven to emit light.

In order to make a brightness of the icon symbol 111 uniform, a diffuser 230 is usually provided between the cover 110 and the housing 220 in an existing vehicle-mounted dashboard. Usually, a thickness of the diffuser 230 is in a range from 0.5 mm to 0.8 mm. In order to prevent the diffuser 230 from being scratched by the housing 220 made of plastic or other materials, a gap is usually provided between the diffuser 230 and a top portion of a side wall 223 of the housing 220 that forms the receiving chamber 221, for example, the gap is in a range from 0.1 mm to 0.2 mm.

The icon region 112 of the current vehicle-mounted dashboard is small, and a space between adjacent icon symbols 111 is small, the space between adjacent icon symbols 111 is usually only about 3 mm, due to an arrangement of the diffusion 230 and the gap located between the diffusion 230 and the top portion of the side wall 223 of the housing 220 which is used to form the receiving chambers 221, a phenomenon of light leakage occurs between adjacent icon symbols 111 in the existing vehicle-mounted dashboard, such as, upon a light source 222 emitting light to illuminate the icon symbol 111 corresponding to the light source, a part of the emitted light reaches the icon symbol 111 adjacent thereto which should be in a dark state, thereby affecting the display effect. As illustrated in FIG. 2, the reasons for the occurrence of light leakage are as follows.

1. The light source 222 below the icon symbol 111 of "abcd" on the right side emits light to illuminate the icon symbol 111 of "abcd", but part of the light emitted from the light source 222 below the icon symbol 111 of "abcd" passes through the diffuser 230 to the icon symbol 111 of "ABDC" on the left side, so that the icon symbol 111 of "ABDC" is also illuminated slightly.

2. The light source 222 below the icon symbol 111 of "abcd" on the right side emits light to illuminate the icon symbol 111 of "abcd", but part of the light emitted from the light source 222 below the icon symbol 111 of "abcd" passes through the gap located between the diffuser 230 and the top portion of the side wall 223 of the housing 220 which is used to form the receiving chamber 221, and goes to the icon symbol 111 of "ABDC" on the left side, so that the icon symbol 111 of "ABDC" is also illuminated slightly.

To this end, embodiments of the present disclosure provide a diffuser and an indication panel. The diffuser includes a plurality of light-transmitting regions and a light-shielding region located between adjacent ones of the plurality of light-transmitting regions, and each light-transmitting region corresponds to an icon symbol on the indication panel. Therefore, the diffuser can avoid a phenomenon of light leakage between adjacent icon symbols, thereby improving display effect of the indication panel.

Hereinafter, the diffuser and the indication panel provided by embodiments of the present disclosure will be described in detail with reference to the drawings.

Figure 3:
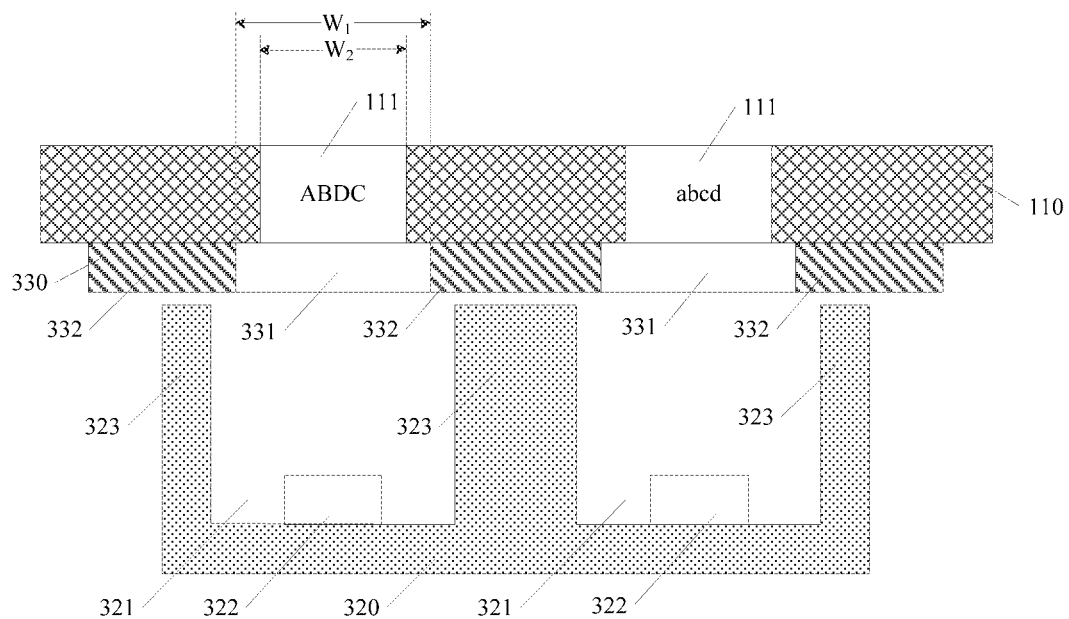
FIG. 3 is a cross-sectional view of a vehicle-mounted dashboard provided by an embodiment of the present disclosure.

FIG. 3 is a cross-sectional view of a vehicle-mounted dashboard provided by an embodiment of the present disclosure. As illustrated in FIG. 3, the diffuser 330 includes a plurality of light-transmitting regions 331 and a light-shielding region 332 located between adjacent ones of the plurality of light-transmitting regions 331, and each of the plurality of light-transmitting regions 331 corresponds to an icon symbol 111 on the indication panel. It should be noted that the above-mentioned vehicle-mounted dashboard is an indication panel.

The diffuser provided by the embodiment of the present disclosure can be applied to an indication panel, and light emitted from a light source can be emitted through a light-transmitting region of the diffuser, thereby illuminating the icon symbol corresponding to the light-transmitting region; and light emitted from the light source is blocked by a light-shielding region, thereby avoiding a phenomenon of light leakage between adjacent icon symbols, thereby improving display effect of the indication panel.

In some exemplary embodiments, as illustrated in FIG. 3, the vehicle-mounted dashboard includes a cover 110, a housing 320, and a diffuser 330. The diffuser 330 is located between the cover 110 and the housing 320. The cover 110 is formed with a plurality of icon symbols 111, and the housing 320 is formed with a plurality of receiving chambers 321 corresponding to the plurality of icon symbols 111, respectively. The receiving chamber 321 is configured to receive a light source 322, and the diffuser 330 includes a plurality of light-transmitting regions 331 corresponding to the plurality of icon symbols 111, respectively; and a light-shielding region 332 located between adjacent ones of the plurality of light-transmitting regions 331. The light-transmitting region 331 of the diffuser 330 can diffuse the light emitted from the light source 322 corresponding to the light-transmitting region, so that a brightness of the corresponding icon symbol 111 is uniform.

For example, the light-shielding region 332 is arranged around each light-transmitting region 331 and separates two adjacent light-transmitting regions 331 from each other.

In some exemplary embodiments, the plurality of light-transmitting regions 331 are provided in one-to-one correspondence with the plurality of icon symbols 111.

In some exemplary embodiments, the receiving chamber 321 and the icon symbol corresponding thereto are usually in a correspondence in orthographic projection, that is, the light source 322 corresponds to the icon symbol 111 in orthographic projection. In this case, the light-transmitting region 331 is in correspondence in orthographic projection with the icon symbol 111 corresponding to the light-transmitting region. That is, the light source 322, the light-transmitting region 331, and the icon symbol 111 correspond to each other in orthographic projection. It should be noted that, the above-mentioned "the receiving chamber corresponds to the icon symbol in orthographic projection" refers to that an orthographic projection of the receiving chamber on the diffuser overlaps with an orthographic projection of the icon symbol corresponding to receiving chamber on the diffuser.

In the vehicle-mounted dashboard provided by this embodiment, the diffuser 330 can be divided into a light-transmitting region 331 and a light-shielding region 332 located between adjacent ones of the plurality of light-transmitting regions 331 to prevent light leakage from a position of the diffuser 330 between adjacent icon symbols 111, thereby improving display effect of the vehicle-mounted dashboard.

In some exemplary embodiments, an area of an orthographic projection of the light-transmitting region 331 on the cover 110 is larger than that of the icon symbol 111 corresponding to the light-transmitting region. That is, the area of the light-transmitting region 331 is larger than that of the orthographic projection of the icon symbol 111 corresponding to the light-transmitting region on the diffuser 330, thereby improving a brightness uniformity effect of the light-transmitting region 331 to the icon symbol 111 corresponding thereto, and improving brightness uniformity of the icon symbol 111 on display.

In some exemplary embodiments, an orthographic projection of the icon symbol 111 on the diffuser 330 falls within the light-transmitting region 331 corresponding to the icon symbol. In some exemplary embodiments, a radial width of the light-transmitting region 331 is larger than a radial width of the icon symbol 111 by about 0.5 mm. The radial width of the light-transmitting region 331 is W1 as illustrated in FIG. 3 and the radial width of the icon symbol 111 is W2 as illustrated in FIG. 3. In the case where an icon region of the current vehicle-mounted dashboard is small, and a space between adjacent icon symbols 111 is small (the space between adjacent icon symbols 111 is usually only about 3 mm), this arrangement provided by this embodiment can simultaneously eliminate light leakage from a position of the diffuser 330 between adjacent icon symbols 111 and improve brightness uniformity of the light-transmitting region 331 to the icon symbol 111 corresponding thereto. In some alternative implementations of this embodiment, the light-shielding region 332 is formed by printing ink on a surface of the diffuser 330 facing the light source 322, that is, a lower surface of the diffuser 330 is printed with ink at intervals in FIG. 3 to form the light-shielding region 332 that divides the diffuser 330 into a light-transmitting region 331 and a light-shielding region 332. For example, the light-shielding region 331 includes printing ink on a surface of the diffuser 330 away from the icon symbol 111. Therefore, the diffuser 330 provided by this embodiment is easy to prepare, and can be directly obtained by modifying an existing diffuser by dividing a diffuser into the light-transmitting region 331 and the light-shielding region 332. Of course, the embodiments of the present disclosure include but are not limited thereto.

In some exemplary embodiments, the light-shielding region 332 is made of a light-shielding material, thereby obtaining a better light shielding effect, and more completely avoiding light leakage from a position of the diffuser 330 between adjacent icon symbols 111.

In some exemplary embodiments, the space between adjacent icon symbols 111 is less than 3 mm; the diffuser 330 includes a groove formed in the light-shielding region 332 between the adjacent light-transmitting regions 331, so that a top portion of the side wall 323 of the housing 320 which is used to form the receiving chamber 321 can be inserted in the groove. In the case where the space between adjacent icon symbols 111 is 3 mm or more, because the gap between the diffuser 330 and the housing 320 is usually 0.1 mm-0.2 mm, the light leakage between adjacent icon symbols 111 is negligible due to an attenuation of light transmitted by a long distance. However, in the case where the distance between adjacent icon symbols 111 is less than 3 mm, the phenomenon of the light leakage between the adjacent icon symbols 111 at the gap between the diffuser 330 and the housing 320 will affect the display effect. By adopting this implementation manner, in the case where the distance between the adjacent icon symbols 111 is less than 3 mm, light leakage of the adjacent icon symbols 111 at the gap between the diffuser 330 and the housing 320 can be avoided.

Figure 4:
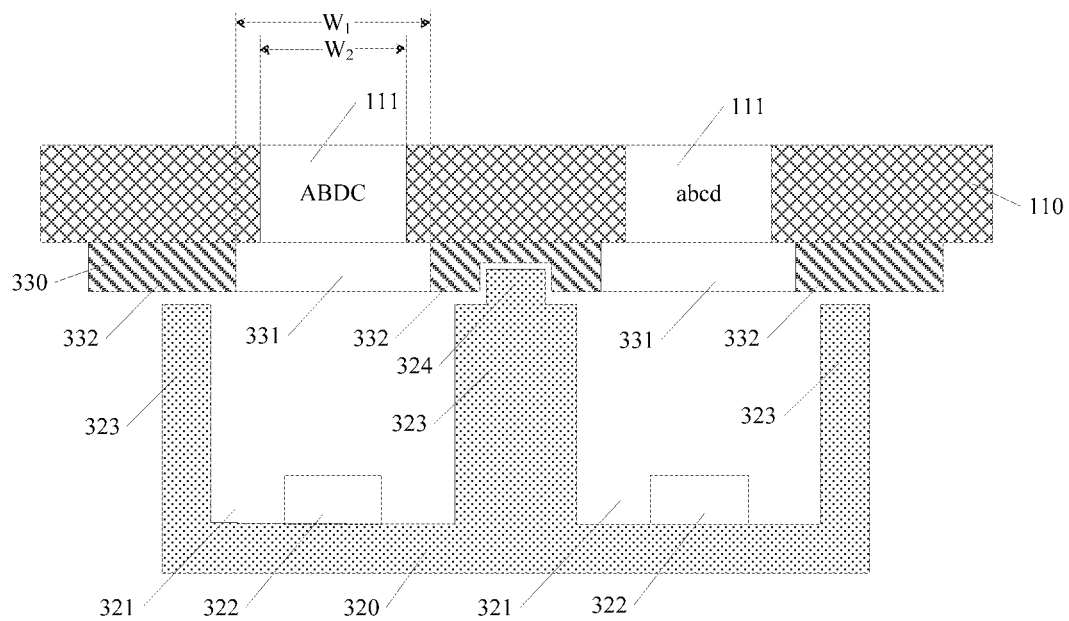
FIG. 4 is a cross-sectional view of another vehicle-mounted dashboard provided by an embodiment of the present disclosure.

In some exemplary embodiments, as illustrated in FIG. 4, the top portion of the side wall 323 of the housing 320 that forms the receiving chamber 321 is provided with a protrusion 324, and the protrusion 324 can be inserted in the groove. That is, the top portion of the side wall 323 of the housing 320 which is used to form the receiving chamber 321 is inserted into the groove through the protrusion 324 provided on the top portion of the side wall 323.

In some exemplary embodiments, the groove is matched with the protrusion 324 in a manner of clearance fit.

This optional arrangement can prevent the diffuser 330 from being scratched by the protrusion 324 provided on the top portion of the side wall 323 of the housing 320 which is used to form the receiving chamber 321, and can avoid a displacement of the diffuser 330 that may occur which may be caused by bumps during the running of the vehicle if the protrusion 324 contacts the groove, so as to avoid at least part of the icon symbol 111 from being blocked by the light-blocking region, and/or other icon symbols 111 not corresponding to the predetermined light-transmitting region 331 to be illuminated.

In some exemplary embodiments, a height of the protrusion 324 is about 0.4 mm.

In the case where the distance between adjacent icon symbols is less than 3 mm, this arrangement can eliminate the light leakage between adjacent icon symbols 111 at the gap between the diffuser 330 and the housing 320. It can be understood that the height of the protrusion 324 can also be set to be greater than 0.4 mm.

In some exemplary embodiments, the groove is formed at a middle position of the light shielding region 332 to which the groove belongs.

This optional arrangement can eliminate light leakage between adjacent icon symbols 111 at the gap between the diffuser 330 and the housing 320.

In the description of the embodiments of the present disclosure, the terms referring to positions or positional relationships such as "upper" and "lower" are based on the positions or positional relationships illustrated in the drawings, are only for the convenience of describing the present disclosure and simplifying the description, and are not referred to specific positions, or an configuration or operation in specific position, and therefore cannot be constructed as a limitation of the present disclosure. It should also be noted that in the description of the present disclosure, the terms "include", "including" or any other variants thereof are intended to cover a non-exclusive inclusion, so that a process, a method, an object or a device including a series of elements not only includes those elements as listed, but also includes other elements not explicitly listed, or elements necessary to the process, method, object, or device. Without more restrictions, the elements defined by the sentence "including a . . . " do not exclude the existence of other identical elements in the process, method, object, or device including the elements.

The following should be explained.

(1) The accompanying drawings involve only the structure(s) in connection with the embodiment(s) of the present disclosure, and other structure(s) may be referred to common design(s).

(2) In case of no conflict, features in one embodiment or in different embodiments may be combined.

The above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A diffuser applied to an indication panel, comprising:
a plurality of light-transmitting regions; and
a light-shielding region located between adjacent ones of the plurality of light-transmitting regions,
wherein each of the light-transmitting regions corresponds to an icon symbol on the indication panel, a space between adjacent icon symbols is less than 3 mm, the diffuser comprises a groove, and the groove is located in the light-shielding region.

2. The diffuser according to claim 1, wherein the indication panel comprises a plurality of icon symbols, and the plurality of light-transmitting regions are in a one-to-one correspondence with the plurality of icon symbols.

3. The diffuser according to claim 1, wherein an orthographic projection of the icon symbol on the diffuser falls within one of the plurality of light-transmitting regions that corresponds to the icon symbol.

4. The diffuser according to claim 1, wherein an area of the light-transmitting region is larger than that of an orthographic projection of the icon symbol that corresponds to the light-transmitting region on the diffuser.

5. The diffuser according to claim 1, wherein a radial width of the light-transmitting region is larger than that of the icon symbol by 0.5 mm.

6. The diffuser according to claim 1, wherein the light-shielding region comprises printing ink located on a surface of the diffuser away from the icon symbol.

7. The diffuser according to claim 1, wherein the light-shielding region comprises a light-shielding material.

8. The diffuser according to claim 1, wherein the indication panel comprises a cover and a housing, the diffuser is located between the cover and the housing, and a plurality of icon symbols are located on the cover, the housing has a plurality of receiving chambers corresponding to the plurality of icon symbols, respectively, and each of the plurality of receiving chambers is configured to receive a light source.

9. An indication panel, comprising:
a cover;
a housing; and
a diffuser, located between the cover and the housing,
wherein the diffuser comprises a plurality of light-transmitting regions, and a light-shielding region located between adjacent ones of the plurality of light-transmitting regions, each of the light-transmitting regions corresponds to an icon symbol on the indication panel, the indication panel further comprises a plurality of icon symbols, wherein a space between adjacent icon symbols is less than 3 mm, the housing comprises a side wall configured to form the plurality of receiving chambers, and the diffuser comprises a groove located in the light-shielding region, so that a top portion of the side wall is inserted in the groove.

10. The indication panel according to claim 9, wherein the top portion of the side wall is provided with a protrusion, and the protrusion is configured to be inserted into the groove.

11. The indication panel according to claim 10, wherein the groove and the protrusion are matched with each other in a manner of clearance fit.

12. The indication panel according to claim 10, wherein a height of the protrusion is 0.4 mm.

* * * * *